United States Patent
Adcock et al.

(10) Patent No.: US 11,460,854 B1
(45) Date of Patent: Oct. 4, 2022

(54) SYSTEM TO DETERMINE FLOOR OR OBSTACLE BY AUTONOMOUS MOBILE DEVICE

(71) Applicant: AMAZON TECHNOLOGIES, INC., Seattle, WA (US)

(72) Inventors: Mark Adcock, Cambridge (GB); Simon Edwards-Parton, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 16/861,025

(22) Filed: Apr. 28, 2020

(51) Int. Cl.
  *G05D 1/00* (2006.01)
  *G05D 1/02* (2020.01)

(52) U.S. Cl.
  CPC ......... *G05D 1/0238* (2013.01); *G05D 1/0094* (2013.01); *G05D 1/0274* (2013.01); *G05D 2201/0207* (2013.01)

(58) Field of Classification Search
  CPC .. G05D 1/0238; G05D 1/0094; G05D 1/0274; G05D 2201/0207
  See application file for complete search history.

(56) References Cited

U.S. PATENT DOCUMENTS

| 10,762,655 | B1* | 9/2020 | Lindskog | H04N 5/365 |
| 2010/0220932 | A1* | 9/2010 | Zhang | G06K 9/6297 |
| | | | | 382/209 |
| 2011/0176722 | A1* | 7/2011 | Sizintsev | G06T 7/97 |
| | | | | 382/154 |
| 2013/0083994 | A1* | 4/2013 | Ren | G06T 7/97 |
| | | | | 382/154 |

(Continued)

FOREIGN PATENT DOCUMENTS

| CN | 111105452 A | * | 5/2020 | |
| WO | WO-2019211459 A1 | * | 11/2019 | |
| WO | WO-2020084091 A1 | * | 4/2020 | G06T 7/593 |

OTHER PUBLICATIONS

Arnold, R. David, "Automated Stereo Perception", Department of Computer Science Stanford University, Mar. 1983, 133 pages. Retrieved from the Internet: URL: https://apps.dtic.mil/dtic/tr/fulltext/u2/a130645.pdf.

(Continued)

*Primary Examiner* — Peter D Nolan
*Assistant Examiner* — Peter Y Ning
(74) *Attorney, Agent, or Firm* — Lindauer Law, PLLC

(57) ABSTRACT

An autonomous mobile device (AMD) moving in a physical space determines the presence of obstacles using images acquired by a stereocamera and avoids those obstacles. A floor with few visible features is difficult to characterize. The floor and any obstacles thereon may be difficult to characterize due to noise, perspective effect, and so forth. A score is determined that indicates whether a particular pixel in an image is deemed to be associated with a parallel surface (the floor) or a perpendicular surface (an obstacle). The score is computationally inexpensive to calculate and allows for highly accurate and low latency determinations as to the presence of an obstacle that would impede movement of the AMD. Orientation changes in the AMD, such as movement over a bumpy floor, are well tolerated as are floor features such as flooring transitions, ramps, and so forth which the AMD is able to traverse.

20 Claims, 6 Drawing Sheets

(56) References Cited

U.S. PATENT DOCUMENTS

| | | | | |
|---|---|---|---|---|
| 2014/0147031 | A1* | 5/2014 | Rzeszutek | G06T 7/593 382/154 |
| 2019/0244380 | A1* | 8/2019 | Op Het Veld | G06V 10/751 |
| 2019/0362514 | A1* | 11/2019 | Sinha | G06V 10/758 |
| 2020/0082556 | A1* | 3/2020 | Sano | G06T 7/593 |
| 2021/0065379 | A1* | 3/2021 | Zhang | G06V 10/25 |
| 2022/0004802 | A1* | 1/2022 | Shibata | G06K 9/6215 |

OTHER PUBLICATIONS

Barcelo, et al., "Image-based Floor Segmentation in Visual Inertial Navigation", KTH Royal Institute of Technology, IEEE Instrumentation and Measurement Technology Conference, May 2013, 7 pages. Retrieved from the Internet: URL:https://www.researchgate.net/publication/261167905_Image-based_floor_segmentation_in_visual_inertial_navigation/link/548dbcae0cf214269f2434f6/download.

Bleyer, et al., "PatchMatch Stereo—Stereo Matching with Slanted Support Windows", 2011, 14 pages. Retrieved from the Internet: URL: http://www.bmva.org/bmvc/2011/proceedings/paper14/paper14.pdf.

Bobick, et al., "Large Occlusion Stereo", The Media Laboratory Massachusetts Institute of Technology, 25 pages. Retrieved from the Internet: URL: http://www.ccs.neu.edu/home/intille/papers-files/occl-journal.pdf.

Chen, et al., "A Fast Trilateral Filter based Adaptive Support Weight Method for Stereo Matching", DOI 10.1109/TCSVT.2014.2361422, IEEE Transactions on Circuits and Systems for Video Technology, IEEE, 2013, 14 pages. Retrieved from the internet: URL: https://liris.cnrs.fr/Documents/Liris-6959.pdf.

Cigla, et al., "Information Permeability for Stereo Matching", Electrical and Electronics Department, Middle East Technical University, Turkey & ASELSAN Inc., Nov. 12, 2012, 17 pages. Retrieved from the Internet: URL:https://www.researchgate.net/publication/259135245_Information_permeability_for_stereo_matching.

Emaduddin, et al., "Accurate floor detection and segmentation for indoor navigation using RGB+D and stereo cameras", Dept. of Computer Engineering College of Computer Science and Information, King Saud University, Riyadh, Saudi Arabia. Conference on Image Processing, Computer Vision, and Pattern Recognition (IPCV 2012, Jul. 16-19, USA), Volume: vol. 2, 7 pages. Retrieved from the Internet: URL: https://www.researchgate.net/publication/235909103_Accurate_floor_detection_and_segmentation_for_indoor_navigation_using_RGBD_and_stereo_cameras/link/0912f51408120b4bbe000000/download.

Fanello, et al., "Efficient Learning-based Matching for Active Stereo Systems", Computer Vision Foundation, 10 pages. Retrieved from the Internet: URL: http://openaccess.thecvf.com/content_cvpr_2017/papers/Fanello_UltraStereo_Efficient_Learning-Based_CVPR_2017_paper.pdf.

Fanello, et al., "Low Compute and Fully Parallel Computer Vision with Hash Match", Computer Vision Foundation, 10 pages. Retrieved from the Internet: URL: http://openaccess.thecvf.com/content_ICCV_2017/papers/Fanello_Low_Compute_and_ICCV_2017_paper.pdf.

Fang, et al., "Accelerating Cost Aggregation for Real-Time Stereo Matching", Delft University of Technology, Delft, the Netherlands, 9 Pages. Retrieved from the Internet: URL: https://lvdmaaten.github.io/publications/papers/ICPADS_2012.pdf.

Haeusler, et al., "Ensemble Learning for Confidence Measures in Stereo Vision", The University of Auckland Computer Science Department & University of Heidelberg Collaboratory for Image Processing, 8 pages. Retrieved from the Internet: URL: https://www.cs.auckland.ac.nz/~rhae001/publications/cvpr2013/main.pdf.

Hamzah, et al., "Literature Survey on Stereo Vision Disparity Map Algorithms", Hindawi Publishing Corporation, Journal of Sensors, vol. 2016, Article ID 8742920, 23 pages. Retrieved from the Internet: URL: http://downloads.hindawi.com/journals/js/2016/8742920.pdf.

Hernandez-Juarez, et al., "Embedded real-time stereo estimation via Semi-Global Matching on the GPU", The International Conference on Computational Science, Procedia Computer Science, vol. 80, 2016, pp. 143-153. Retrieved from the Internet: URL: https://reader.elsevier.com/reader/sd/pii/S1877050916306561token=38B8C01B471388440DA8E83F5AF4D190727B4F49751C0881343CD39459EAD2AD220D913FDABBC224666CC0195457FC8B.

Hirschmuller, et al., "Real-Time Correlation-Based Stereo Vision With Reduced Border Errors", Center for Computational Intelligence, De Montfort University, Leicester, UK, 16 pages. Retrieved from the Internet: URL: http://citeseerx.ist.psu.edu/viewdoc/download?doi=10.1.1.3.1112&rep=rep1&type=pdf.

Hirschmuller, Heiko, "Stereo Processing by Semi-Global Matching and Mutual Information", IEEE Transaction of Pattern Analysis and Machine Intelligence, 2007, 14 pages. Retrieved from the Internet: URL: https://core.ac.uk/download/pdf/11134866.pdf.

Humenberger, et al., "A fast stereo matching algorithm suitable for embedded real-time systems", Austrian Institute of Technology & Automation and Control Institute Vienna University of Technology, Jan. 26, 2009, 3 pages. Retrieved from the Internet: URL: https://www.semanticscholar.org/paper/A-fast-stereo-matching-algorithm-suitable-for-Humenberger-Zinner/a11edeab7232649cd7e16fe23cb17830bfcf121e.

Kanade, et al., "A Stereo Matching Algorithm with an Adaptive Window: Theory and Experiment", School of Computer Science Carnegie Mellon University, Information Systems Research Center Canon Inc., Proceedings of the 1991 IEEE International Conference on Robotics and Automation Sacramento, California—Apr. 1991, 8 pages. Retrieved from the Internet: URL: https://www.cs.cmu.edu/~ph/869/papers/kanade-okutomi.pdf.

Kang, et al.,"Handling Occlusions in Dense Multi-view Stereo", 8 pages. Retrieved from the Internet: URL: http://faculty.cs.tamu.edu/jchai/papers/cvpr01-stereo.pdf.

Keselman, et al., "Intel RealSense Stereoscopic Depth Cameras", Intel Corporation, CVPR Workshop Paper, pp. 1-10. Retrieved from the Internet: URL: http://openaccess.thecvf.com/content_cvpr_2017_workshops/w15/papers/Keselman_Intel_RealSense_Stereoscopic_CVPR_2017_paper.pdf.

Mei, et al., "On Building an Accurate Stereo Matching System on Graphics Hardware", Samsung Advanced Institute of Technology & LIAMA-NLPR, Institute of Automation, Chinese Academy of Sciences, 8 pages. Retrieved from the Internet: URL: http://www.nlpr.ia.ac.cn/2011papers/gjhy/gh75.pdf.

Okutomi, et al., "A Locally Adaptive Window for Signal Matching", Information Systems Research Center Canon Inc., School of Computer Science Carnegie Mellon University, International Journal of Computer Vision 7(2):143-162—Jan. 1992, 10 pages. Retrieved from the Internet: URL: https://www.researchgate.net/publication/220660288_A_locally_adaptive_window_for_signal_matching.

Perreault, et al., "Median Filtering in Constant Time", Computer Vision and Systems Lab, Universite Laval, Canada, 6 pages. Retrieved from the Internet: URL: https://nomis80.org/ctmf.pdf.

Poggi, et al., "Quantitative Evaluation of Confidence Measures in a Machine Learning World", University of Bologna Department of Computer Science and Engineering, 10 pages. Retrieved from the Internet: URL: http://vision.deis.unibo.it/~ftosi/papers/iccv2017_review.pdf.

Scharstein, et al., "A Taxonomy and Evaluation of Dense Two-Frame Stereo Correspondence Algorithms", Dept. of Math and Computer Science, Middlebury College, pp. 1-35. Retrieved from the Internet: URL: https://users.umiacs.umd.edu/~fer/cmsc426/images/taxonomy-IJCV.pdf.

Spangenberg, et al., "Weighted Semi-Global Matching and Center-Symmetric Census Transform for Robust Driver Assistance", Freie Universitat Berlin, Institute of Information; vol. 8048of Lecture Notes in Computer Science, 2013 pp. 34-41. Retrieved from the Internet: URL: https://www.mi.fu-berlin.de/inf/groups/ag-ki/publications/Semi-Global_Matching/caip2013rsp_fu.pdf.

Veit, Thomas, "Connexity based fronto-parallel plane detection for stereovision obstacle segmentation", LIVIV/INRETS, France, 4

(56) References Cited

OTHER PUBLICATIONS pages. Retrieved from the Internet: URL: https://pdfs.semanticscholar.org/9fa5/pd5e0a791f5b2d58696798fc5de28b6fa29e.pdf.

Veksler, Olga, "Fast Variable Window for Stereo Correspondence using Integral Images", NEC Laboratories America, 6 pages. Retrieved from the Internet: URL:http://www.csd.uwo.ca/faculty/olga/Papers/cvpr03-a.pdf.

Veksler, Olga, "Stereo Matching by Compact Windows via Minimum Ratio Cycle", NEC Research Institute, 8 pages. Retrieved from the Internet: URL: http://www.csd.uwo.ca/faculty/olga/Papers/iccv01.pdf.

Zabih, et al., "Non-parametric Local Transforms for Computing Visual Correspondence", Computer Science Department Cornell University & Interval Research Corporation, 8 pages. Retrieved from the Internet: URL: http://www.cs.cornell.edu/~rdz/Papers/ZW-ECCV94.pdf.

Zhang, et al., "Real-Time Accurate Stereo with Bitwise Fast Voting on CUDA", Interuniversity Micro_electronics Center (IMEC), Katholieke Universiteit Lueven, Belgium, 7 pages. Retrieved from the internet: URL:https://homes.esat.kuleuven.be/~konijn/publications/2009/iccv2009w_104.pdf/.

\* cited by examiner

US 11,460,854 B1

SYSTEM TO DETERMINE FLOOR OR OBSTACLE BY AUTONOMOUS MOBILE DEVICE

BACKGROUND

An autonomous mobile device (AMD) moves throughout a physical space. To facilitate this movement, the AMD uses information about where it is in the physical space, and location of obstacles.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
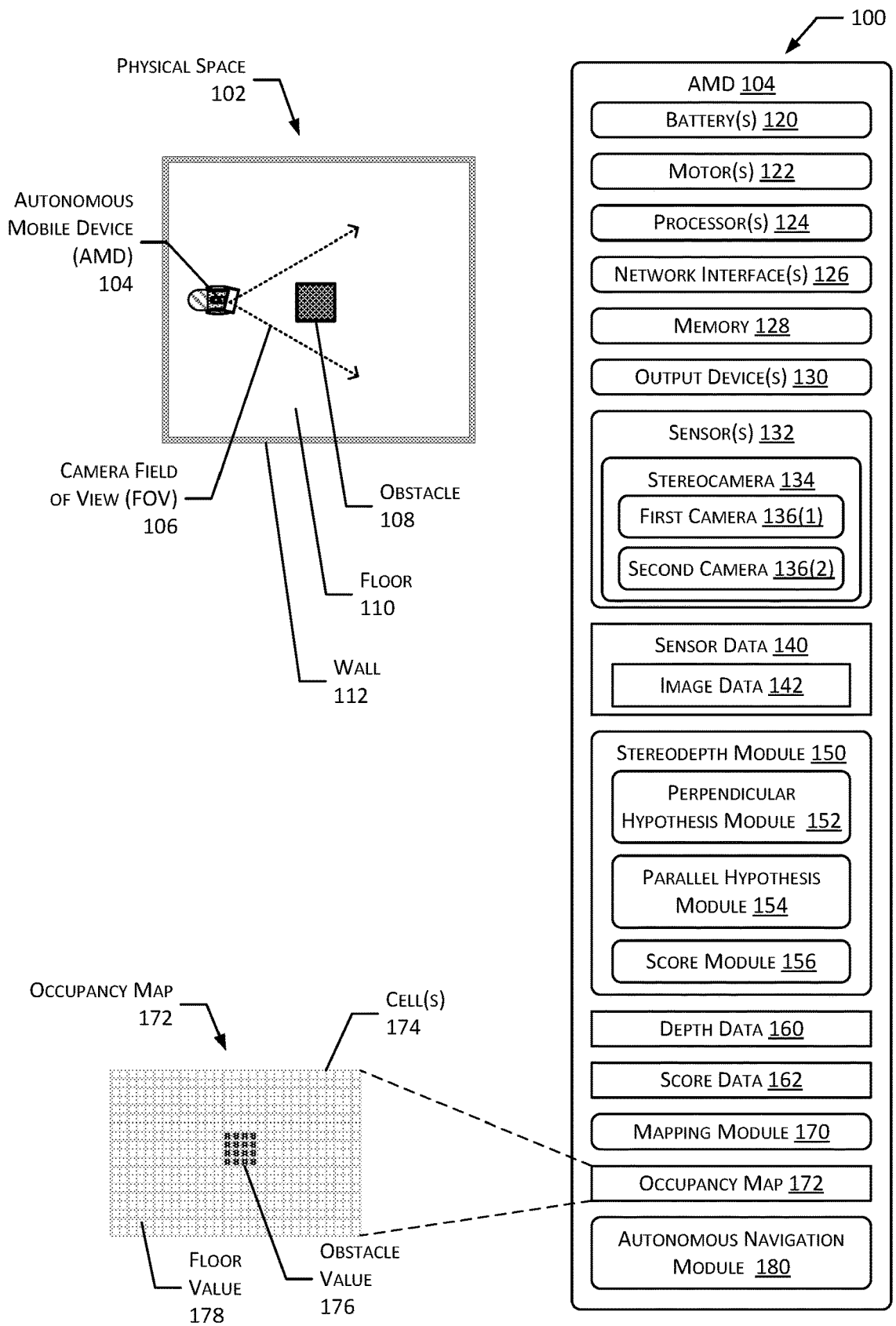
FIG. 1 illustrates a system for distinguishing a floor and obstacles in a physical space by an autonomous mobile device (AMD) using data from a stereocamera, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement, allowing it to move from one location in the physical space to another without being "driven" or remotely controlled by a user. The AMD may perform tasks that involve moving within the physical space. These tasks may also include patrolling the physical space, interacting with users, and so forth. For example, the AMD may perform sentry tasks involving moving through rooms in the physical space.

During autonomous movement, the AMD may perform a mapping process that determines where obstacles are in the physical space. Various sensors may be used to acquire data about the physical space. For example, left and right images acquired by a stereocamera comprising a left camera and a right camera may be processed with a stereodepth system. The stereodepth system attempts to identify a feature in the right image and find the same feature in the left image. Because the two cameras are separated by a "baseline" distance that is known, the apparent position in each of these images of that feature changes in a known way.

By knowing the difference, or "disparity" between the two images and some other factors about the cameras, a distance to that feature can be calculated. For example, a disparity of 20 pixels may be determined to represent a distance of 28 centimeters (cm) from the right camera.

The images acquired from the cameras exhibit a "perspective effect". For example, in the distance otherwise parallel lines such as the edges of a rectangular carpet will start to converge at a perspective point. This perspective effect can change the observed disparity. This change in observed disparity becomes particularly acute in situations where the cameras are relatively close to the floor, an optical axis of the cameras is parallel to the floor, and so forth. For example, a stereocamera that is 15 cm above the floor and directed upwards at 10 degrees may experience significant changes in disparity, resulting in significant errors is determining distance to an obstacle using conventional stereodepth techniques.

Placement of the stereocamera and perspective effect may result in a situation in which the floor in the field of view of the stereocamera is incorrectly determined to be an obstacle. For example, conventional stereodepth systems, when using images acquired from a stereocamera relatively close to the floor, may interpret an otherwise flat floor as being an obstacle. In such a situation, the AMD would be unable to find an unobstructed path due to the floor surrounding the AMD being incorrectly designated as obstacles.

To facilitate movement of the AMD, accurate distinction between the floor and the presence of an actual obstacle on the floor is extremely useful. For example, using information about the presence or absence of obstacles allows the AMD to navigate around such obstacles, instead of colliding with them. An obstacle may be considered an object or architectural feature such as a stairwell or ledge that impedes motion of the AMD.

While some of the issues may be mitigated by elevating the stereocamera or angling the stereocamera downwards, this may not be possible with some AMD designs. For example, the AMD may have a low profile form factor that would not support elevating the stereocamera to a height of 1.5 meters.

Traditional techniques used to determine the location of the floor may involve attempting to fit the depths as determined from disparity with an assumed plane. However, these "plane fitting" techniques are computationally intensive and may not be accurate. Such computationally intensive operations may be particularly troublesome on an AMD with limited resources such as smaller processors, less available battery power, and so forth. Plane fitting also fails when insufficient features are visible on the floor. These techniques are also time intensive, taking extended times to generate output. Because it would be inadvisable for the AMD to move without knowing if an obstacle is present, this may result in the speed of movement of the AMD being reduced. As a result, traditional techniques may limit the maximum speed of the AMD during operation.

The traditional techniques, including plane fitting, may not facilitate the determination of an obstacle that is on the floor, particularly low obstacles. For example, a low obstacle may comprise an obstacle that would impede traversal of the robot but does not have a height such that the apparent height in the images is above the horizon as depicted in the image.

Described in this disclosure are techniques and devices that are able to determine whether a particular portion of an image, such as a particular pixel, is associated with the floor or is an obstacle. During processing of the images acquired by the stereocamera, a score is calculated for a pixel or other portion of the image. The score is indicative of a likelihood that the pixel is parallel or is perpendicular with respect to the floor upon which the stereocamera affixed to the AMD is supported. If the score is indicative of the pixel being parallel, a point in space associated with that pixel may be designated as being floor. If the score is indicative of the pixel being perpendicular, the point in space associated with that pixel may be designated as being an obstacle.

A first image is acquired by a first camera in a stereocamera and a second image is acquired from a second camera in the stereocamera. Each image comprises a plurality of pixels. For ease of discussion, comparisons and measurements may be performed with respect to the right camera and the right image.

To determine a location in space of an object using a stereodepth system, a disparity or apparent change in position of a feature between pairs of images is used. Relative to the right camera, a point in a physical space may be calculated based on where that feature is in the right image (such as a row and column coordinate) and the disparity between the right and left images.

For stereodepth to be effective, various techniques are used to try and determine if part of the right image is likely depicted in the left image. In one technique, comparison blocks of pixels, each block being centered on a comparison pixel, in the left image are compared to a target block of pixels in the right image to determine if they depict the same feature. The target block is centered on a target pixel. For example, a local binary pattern, such as first census transform data, may be calculated for the target block and second census transform data may be calculated for several comparison blocks. A Hamming distance may be calculated for the first census transform data as compared to individual ones of the second census transform data for the target blocks. A best match may be determined when the comparison block having the lowest Hamming distance cost relative to the target block is determined. Once the best match is determined, the center pixel of the comparison block associated with the second census transform data is designated as the pixel that matches the target pixel in the right image. The disparity value is the distance, in pixels, that may comprise the geometric distance between the coordinates of the target pixel and the targets of the comparison pixel associated with the best match. The disparity cost is indicative of how closely the blocks, centered on those pixels, match.

In the techniques described in this disclosure, a first disparity cost and a second disparity cost are calculated. The first disparity cost is calculated using the assumption that the disparity values of the pixels within the respective blocks are identical. For example, this assumption would be true in the circumstance where the pixels are associated with features on a surface that is perpendicular to the ground. The disparity costs within a support region are used to determine aggregated disparity costs. For example, the disparity costs within the support region may be summed to determine the aggregated disparity cost for the pixel that the support region is centered on. A first set of aggregated disparity costs are calculated in this way by changing the comparison pixel used and the apparent location of the support region relative to the second image. A best match may be determined as the aggregated disparity cost from the first set of aggregated disparity costs that is lowest. The best match may comprise a support region centered on a comparison pixel that is deemed to correspond best with our target pixel and is determined as the aggregated disparity value associated with a lowest disparity cost. The first disparity cost is the minimum aggregated disparity cost from the first set of aggregated disparity costs.

The second disparity cost is calculated using the assumption that the disparity values for the rows of the pixels within the respective blocks in the support region are offset relative to one another by a skew value. The skew value may be representative of the apparent disparity due to the perspective effect of the stereocamera. This assumption would be true in circumstances where the pixels are associated with a surface that is parallel to the ground. The skew value may be determined based on the height of the stereocamera, the baseline distance between the cameras, and the angle of an optical axis of the stereocamera relative to the floor. The skew value is used to offset rows of the disparity costs before aggregation. Once offset, the disparity costs within the support region are used to determine a second aggregated disparity cost. A second set of aggregated disparity costs are calculated in this way by changing the comparison pixel used and the apparent location of the support region relative to the second image. The best match may be determined as the aggregated disparity value from the second set of aggregated disparity costs that is lowest. The first disparity cost is the minimum aggregated disparity cost from the second set of aggregated disparity costs.

The score may be calculated for a particular pixel that is based on the first disparity cost and the second disparity cost. For example, the score may comprise a ratio of the first disparity cost and the second disparity cost. The score may be compared with a threshold value to determine if the particular pixel is to be designated as floor or an obstacle. For example, if the score is greater than the threshold value, the pixel may be designated as floor. If the score is less than the threshold value, the pixel may be designated as an obstacle.

In some implementations the scores may be further processed. For example, a confidence value may be determined during the disparity determination. Disparity values and their associated disparity costs having confidence values less than a threshold value may be omitted from determination of the score.

In another implementation, clusters or groupings of scores that are below a relative size of clusters of pixels associated with floor or obstacle may be removed. For example, a small cluster of pixels measuring 3×3 pixels that has scores indicative of "obstacle" and surrounded by pixels having scores indicative of "floor" may be disregarded.

The technique provides a substantial operational advantage by reducing false positives produced by objects that are not obstacles. Some objects or features on the floor may be present but do not impede movement of the AMD. For example, a piece of transition trim that provides a curved surface or ramp between a section of hard floor and a section of carpeted floor may project 1 cm above the surface of the hard floor. However, the AMD may be able to successfully drive over that transition trim, moving from the hard floor to the carpet, and vice versa. Existing techniques would require substantial computing resources to make the determination as to whether that object is traversable or not. By using the techniques in this disclosure, the determination is made with far lower computational costs and with far lower latency.

The stereodepth system may provide as output, based on the disparity values for individual pixels, and the relative placement of those pixels in the image, point cloud data. For example, for each pixel the stereodepth system may provide a coordinate in three-dimensional space (x, y, z) with respect to the stereocamera. The score may then be combined with this information to determine an occupancy map. The occupancy map may comprise a plurality of cells in which each cell represents an area in the physical space. Each cell may be designated as containing an obstacle or not. This designation may be a binary value, indicative of a probability, or other value. In some implementations, this designation may be based at least in part on the score. The occupancy map may then be used by other systems in the AMD. For example, an autonomous navigation module may use the occupancy map to plan a route to move the AMD in the physical space.

Information about the height of an obstacle may also be determined. This information may be used to categorize an obstacle as being relatively low and thus a traversable obstacle or high and would impede traversal. For example, a transition from one flooring to another may comprise a traversable obstacle. In one implementation, the (x, y, z) coordinates for points associated with the obstacle may be used to determine a highest point of the obstacle. If the obstacle is less than a threshold value, it may be deemed a traversable obstacle.

By using the techniques described in this disclosure, the AMD is able to quickly and accurately determine the presence of an obstacle based on image data from a stereocamera. The techniques allow the AMD to better characterize the physical space and move about within the physical space while avoiding collisions. The techniques described are readily incorporated into existing stereodepth systems, adding very little additional computational overhead. The determination of the score does not substantially increase the latency of the stereodepth processing, allowing the AMD to move at higher speeds.

These techniques also allow stereodepth to be used in previously inaccessible circumstances, such as when the stereocamera is close to a surface that may have obstacles, such as a floor or wall. For example, stereodepth may now be used and produce accurate and reliable results when the stereocamera is relatively close to the floor.

Illustrative System

FIG. 1 illustrates a system 100 for distinguishing floor and obstacles in a physical space 102 with an autonomous mobile device (AMD) 104, according to some implementations. The AMD 104 may include cameras, each having a field of view (FOV) 106 that encompasses at least a portion of the physical space 102.

In this illustration an overhead view of the physical space 102 is shown. One or more obstacles 108 may be present within the physical space 102. An obstacle 108 impedes the motion of the AMD 104. For example, obstacles 108 may comprise objects such as people or furnishings, and architectural features such as walls 112, stairwells, ledges, and so forth. A floor 110 of the physical space 102 is also shown. During operation, the AMD 104 is supported by the floor 110.

While moving from one location to another, the AMD 104 needs to determine where it is at a given time, determine the location of obstacles 108, and move while avoiding collisions with any of these obstacles 108. A command to move may be the result of an input from the user, a previously scheduled task, responsive to input from one or more sensors, a command from an external computing device, or another source.

The AMD 104 may include one or more batteries 120 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more motors 122 or other actuators may be used to move the AMD 104 from one location to another in the physical space 102. For example, the AMD 104 may include motors 122 that drive a wheel to move the AMD 104.

The AMD 104 includes one or more hardware processors 124 (processors) configured to execute one or more stored instructions. The processors 124 may comprise one or more cores. The processors 124 may include microcontrollers, systems on a chip, field programmable gate arrays, digital signal processors, graphic processing units, general processing units, and so forth.

The AMD 104 may include a network interface 126 to provide communications between the AMD 104 and other devices such as other AMDs 104, docking stations, routers, access points, and so forth. For example, the network interface 126 may include devices compatible with Wi-Fi, Bluetooth, Bluetooth Low Energy, ZigBee, and so forth.

The AMD 104 includes one or more memories 128. The memory 128 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 128 provides storage of computer-readable instructions, data structures, program modules, and other data for the operation of the AMD 104. A few example functional modules shown here may be stored in the memory 128, although the same functionality may alternatively be implemented in hardware, firmware, as a system on a chip (SoC), and so forth.

The AMD 104 may include one or more output devices 130. For example, the output devices 130 may include one or more of a display device, lights, speakers, and so forth.

The AMD 104 includes one or more sensors 132 used to acquire sensor data 140 about the physical space 102. The sensors 132 include a stereocamera 134. The stereocamera comprises at least a first camera 136(1) and a second camera 136(2). In some implementations the stereocamera 134 may include more than two cameras 136. The first camera 136(1) and the second camera 136(2) may be attached to a structure that maintains a known distance or "baseline" between the two. The first camera 136(1) and the second camera 136(2) are discussed in more detail below with regard to FIG. 2. The stereocamera 134 acquires image data 142 comprising an image of a portion of the scene in the physical space 102 that is within the FOV 106.

The AMD 104 may include other sensors, such as a depth camera, time of flight device, lidar, sonar, and so forth. For example, an ultrasonic sonar system may use pulses of ultrasonic sound to detect the presence of an obstacle 108.

A stereodepth module 150 uses the image data 142 acquired by the stereocamera 134 to determine depth data 160. The stereodepth module 150 processes the image data 142 from the first camera 136(1) and the second camera 136(2) to determine the apparent distance, with respect to one of the cameras 136 in the stereocamera 134. For example, the stereodepth module 150 processes first image data 142(1) acquired by the first camera 136(1) and second image data 142(2) acquired by the second camera 136(2) at a first time. This pair of images, or stereopair, is processed to identify features on an object that are present in the left and right images. A difference, or "disparity value", in where the feature is depicted in the left image with respect to the right image, is then determined that indicates the feature in the left image is 27 pixels to the left of the location of that same feature in the right image.

For ease of illustration, and not necessarily as a limitation, the first camera 136(1) may be the rightmost camera 136, while the second camera 136(2) is the leftmost camera 136 in the stereocamera 134. Disparities, difference, distances, and so forth are described with respect to the first camera 136(1) and the image data 142 acquired by the first camera 136(1). In other implementations, the opposite arrangement may be used.

Optical parameters of the cameras 136 are known in advance, as is the baseline distance between the two cameras 136. Given these known factors, the disparity value can be used to calculate a distance to the feature. For example, 27 pixels may correspond to a distance or "depth" of 60 centimeters (cm) from the first camera 136(1) to the feature on the object. To determine the disparity value, several possible disparities may be tested, and a disparity cost associated with each proposed disparity value determined. For example, proposed disparity values of between 5 and 50 pixels may be tested using a cost function, and a disparity cost for each proposed disparity value calculated. From this set of proposed disparity values, a best match may be determined. For example, the proposed disparity value that is associated with the lowest disparity cost may be deemed the disparity value to be used. A single pixel is unlikely to contain enough information to be a distinguishable feature. As a result, a block of pixels associated with a target pixel are assessed. For example, a target block of pixels may be centered on the target pixel in the first image data 142(1) while a corresponding comparison block is centered on a comparison pixel in the second image data 142(2).

Once a disparity value for a pixel has been determined, that disparity value may be used to determine coordinates of an object in the physical space 102 that is depicted by the pixel in the image data 142. For example, given the known properties of the stereocamera 134, the equations 1-3 may be used to determine coordinates in three-dimensional space (X,Y,Z):

$$Z = baseline * FL / disparity\ value \quad \text{EQUATION 1}$$

$$X = x * Z / FL \quad \text{EQUATION 2}$$

$$Y = y * Z / FL \quad \text{EQUATION 3}$$

where
  FL=focal length of the camera 136
  x is the column of the pixel in the image data 142
  y is the row of the pixel in the image data 142
The stereodepth module 150 includes a perpendicular hypothesis module 152 and a parallel hypothesis module 154. Each module may produce a disparity cost that is based on a different underlying assumption. These disparity costs are then used to determine score data 162 that is associated with an individual target pixel or group of target pixels.

The perpendicular hypothesis module 152 determines a first disparity cost that assumes that a block of pixels centered on a target pixel have the same disparity value. This is visualized by a wall rising from the floor. The various points on the wall that are centered on the target pixel are all at about the same distance from the stereocamera 134, and so would exhibit about the same disparity between the left and right image of the wall. The first disparity cost that is associated with the disparity value having the best match is produced as output from this module.

The parallel hypothesis module 154 determines a second disparity cost that assumes that the block of pixels centered on the target pixel have different disparity values that are offset by some skew value. Depending upon a height of the stereocamera 134 above the floor 110, and the angle of the optical axis of the stereocamera 134, a perspective effect in the resulting image data 142 may be exaggerated. This can be visualized by two parallel lines appearing to converge in the distance. This exaggeration results in a substantial variance in disparity of a feature. The skew value represents the apparent displacement or shift of one row in the image data 142 with respect to another. This is illustrated and discussed in more detail with regard to at least FIG. 2.

In other implementations, other modules may be used instead of, or in addition to, these hypothesis modules. For example, a module may test for a hypothesis as to whether a portion of the image data 142 is associated with a down ramp, an up ramp, and so forth.

The stereodepth module 150 may provide as output depth data 160. The depth data 160 may comprise information indicative of a depth or distance from the first camera 136(1) to a feature that is depicted in the first image data 142(1). By using the output from the perpendicular hypothesis module 152 and the parallel hypothesis module 154, score data 162 may be calculated. The score data 162 is indicative of whether that pixel or other portion of the image data 142 is associated with a perpendicular feature such as an obstacle 108 or a parallel feature such as the floor 110. For example, the score for a pixel may be compared to a threshold value. If the score is greater than the threshold value, that pixel may be associated with an obstacle 108. Likewise, if the score is less than the threshold value, that pixel may be associated with the floor 110.

A mapping module 170 may use the depth data 160 and the score data 162 to determine an occupancy map 172. The occupancy map 172 may comprise data that is representative of the physical space 102 and the presence of obstacles 108, such as walls 112 in the physical space 102. In one implementation, the occupancy map 172 may be representative of a plurality of cells 174, each cell 174 representing a particular area in the physical space 102. For example, each cell 174 may represent an area in the physical space 102 that is 3 cm by 3 cm. Information may be associated with one or more cells 174. For example, an obstacle value 176 may indicate that a cell 174 is deemed to contain an obstacle 108 that would impede movement of the AMD 104. Continuing the example, a floor value 178 may indicate that the cell 174 is known to contain the floor 110 with no obstacles 108 present. Other values may be associated with the cells 174 as well. For example, a portion of the physical space 102 for which sensor data 140 has not been obtained may be designated as unexplored.

The occupancy map 172 may also be determined based at least in part on data from other sensors 132. For example, the sensors 132 may include a depth camera, structured light system, time of flight sensor, radar, sonar, and so forth. The sensor data 140 from these or other sensors 132 may be used to determine the presence of obstacles 108 in the physical space 102.

The AMD 104 may have an autonomous navigation module 180 that provides the AMD 104 with the ability to navigate within the physical space 102 without real-time human interaction. The autonomous navigation module 180 may implement, or operate in conjunction with, the mapping module 170 to determine the occupancy map 172 or other representation of the physical space 102. In one implementation, the mapping module 170 may use one or more simultaneous localization and mapping ("SLAM") techniques. The SLAM algorithms may utilize one or more of maps, algorithms, beacons, or other techniques to navigate. The autonomous navigation module 180 may use the occupancy map 172 to determine a set of possible paths along which the AMD 104 may move. One of these may be selected and used to determine path plan data indicative of a path. For example, a possible path that is the shortest or has the fewest turns may be selected and used to determine the path. The path is then subsequently used to determine a set of commands that drive the motors 122 connected to wheels of the AMD 104. For example, the autonomous navigation module 180 may determine the current location within the physical space 102 and determine path plan data that describes the path to a destination location, such as a docking station.

The AMD 104 may move responsive to a determination made by the processor(s) 124, in response to a command received from the network interface 126, as determined from the sensor data 140, and so forth. For example, an external server may send a command that is received using the network interface 126. This command may direct the AMD 104 to proceed to find a particular user, follow a particular user, and so forth. The AMD 104 may then process this command and use the autonomous navigation module 180 to determine the directions and distances associated with carrying out the command. For example, the command to "come here" may result in sending a command to the autonomous navigation module 180 to move the AMD 104 to a particular location near a user and orient the AMD 104 in a particular direction.

Figure 2:
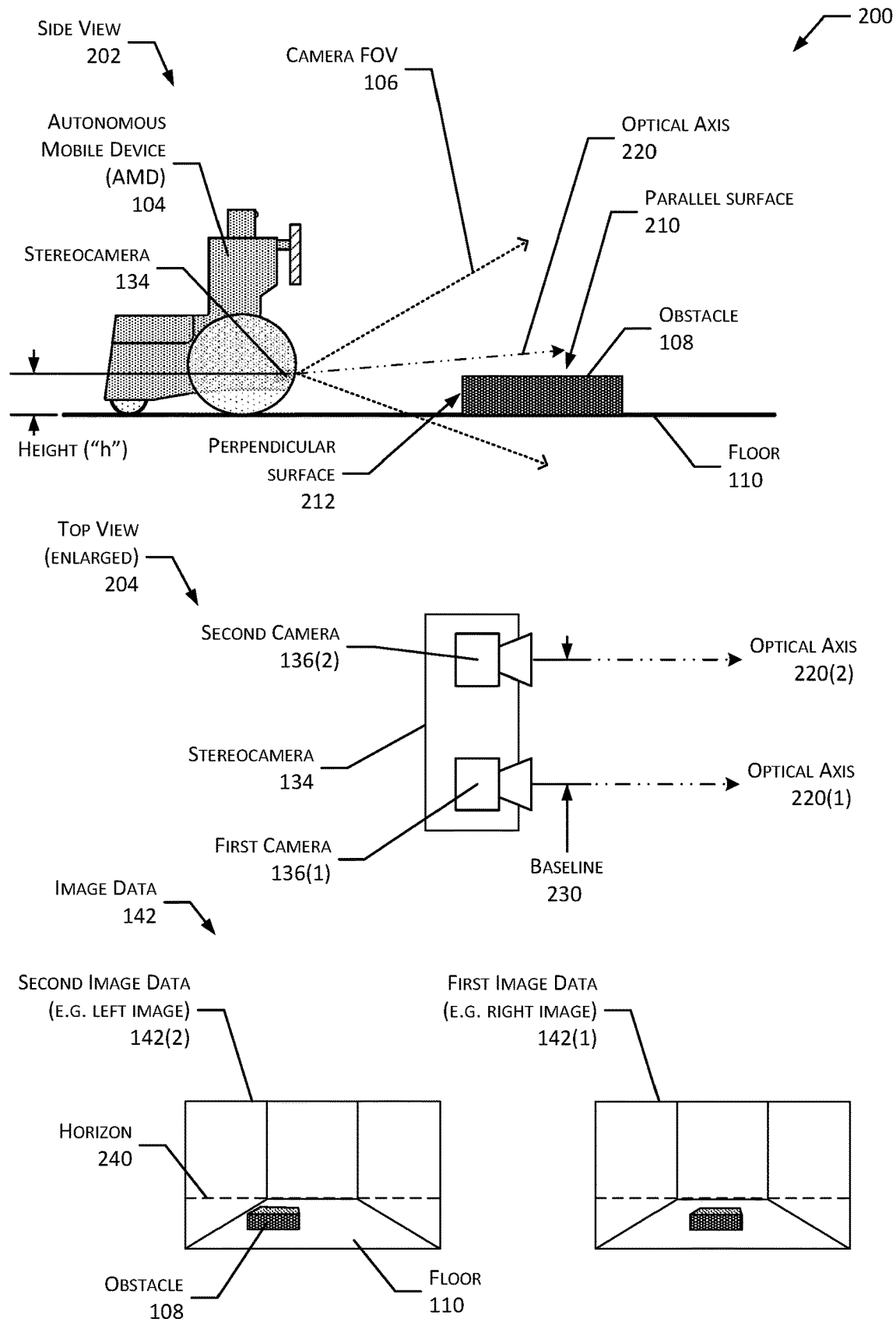
FIG. 2 illustrates the AMD using a stereocamera comprising at least two cameras to acquire image data, according to some implementations.

FIG. 2 illustrates at 200 the AMD 104 using a stereocamera 134 to acquire image data 142, according to some implementations. A side view 202 of the AMD 104 in the physical space 102 is shown, as well as a top view 204 of the stereocamera 134.

The side view 202 depicts the AMD 104 with the stereocamera 134 mounted at a height "h" above the floor 110. Shown on the floor 110 is an obstacle 108 having a parallel surface 210 and a perpendicular surface 212. The parallel surface 210 has a plane that is parallel to a plane of the floor 110. The perpendicular surface 212 has a plane that is perpendicular to the plane of the floor 110.

Each camera 136 has an optical axis 220. For example, the optical axis 220 may comprise a line having an end in a center of a plane of an image sensor and extending from that point perpendicularly to the plane. The top view 204 shows an enlarged view of the stereocamera 134 comprising a first camera 136(1) having a first optical axis 220(1) and a second camera 136(2) having a second optical axis 220(2). The first camera 136(1) and the second camera 136(2) are mounted to a structure that maintains a separation or baseline 230 distance between the two. In some implementations, the first optical axis 220(1) and the second optical axis 220(2) may be parallel to one another.

Also shown is an example of image data 142 from the stereocamera 134. At the same time, the first camera 136(1) acquires first image data 142(1) and the second camera 136(2) acquires second image data 142(2). Due to the relative positions of the cameras 136 and the obstacle 108, the obstacle 108 appears to be in a different location in the respective images. The shape of the obstacle 108 also appears different due at least in part to perspective effects.

Also depicted is a horizon 240. While the AMD 104 is on the floor 110, the horizon 240 may be indicative of a row of pixels below which the floor 110 may be expected to be visible, if present. For example, the horizon 240 may designate that a lowest one-third of the image data 142 may contain floor 110, while portions of the image data 142 above the horizon 240 are likely to contain features other than the floor 110, such as walls 112, sky, and so forth. In some implementations, the horizon 240 may be determined based on the placement of the stereocamera 134, orientation of the stereocamera 134, maximum tilt of the AMD 104 during operation, and so forth. For example, the horizon 240 may be determined to account for the optical axis 220 of the attached stereocamera 134 tilting plus or minus 10 degrees above or below the plane of the floor 110. Such a tilt may result from the AMD 104 moving over an uneven floor 110. For example, as the AMD 104 drives over a transition from one type of flooring to another, it may tilt. In another example, tilt may result from movement of the AMD 104 or the stereocamera 134. For example, the stereocamera 134 may be tilted using an actuator or by application of a force by a user.

In some implementations, the horizon 240 may be used to determine how to process data. For example, the score data 162 may be determined only for pixels that are in rows below the horizon 240. Limiting the determination of score data 162 to this subset of pixels in the image data 142 reduces the processing requirements of the stereodepth module 150.

Figure 3:
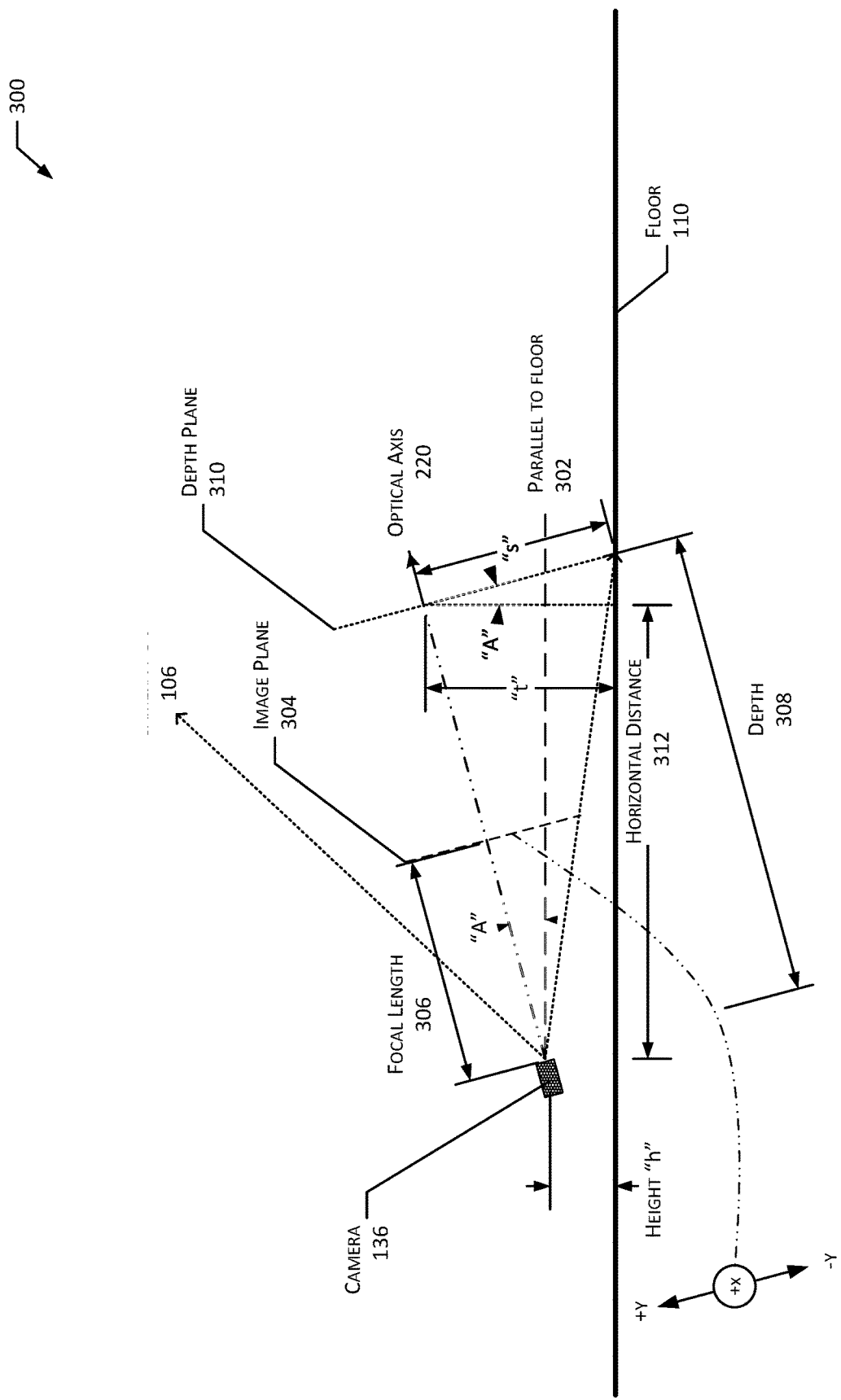
FIG. 3 illustrates some aspects of the optics associated with a camera, according to some implementations.

FIG. 3 illustrates at 300 some aspects of the optics associated with the stereocamera 134, according to some implementations. In this side view, a camera 136 located at height "h" above the floor 110 is shown.

A line parallel 302 to the floor 110 is shown for reference. The camera 136 has a FOV 106 and an optical axis 220 that is directed slightly upward at an angle "A" relative to the line parallel 302 to the floor 110.

The optical axis 220 is orthogonal to an image plane 304, as shown. A focal length ("FL") 306 is shown depicting the distance along the optical axis 220 between a focal point and the image plane 304. Also shown are the axes used to describe pixels in the image data 142. For example, the image data 142 may comprise a plurality of pixels, each pixel occupying a position within a rectangular array with coordinates designated with respect to an x axis indicative of a particular column and a y axis indicative of a particular row.

During operation, the stereodepth module 150 uses disparity between the first and second image data 142 to determine a depth 308 or distance from the camera 136 to a depth plane 310. The optical axis 220 is also orthogonal to the depth plane 310.

As shown in this illustration, as a result of similar triangles, the angle "A" between the optical axis 220 and the line 302 parallel to the floor 302 is the same as the angle between the depth plane 310 and a vertical line "t" from the floor 110 to the point where the optical axis 220 intersects the depth plane 310. A line "s" extends, in the depth plane 310, from the point where the optical axis 220 intersects the depth plane 310 to the floor 110.

As shown in this illustration, due to the orientation of the camera 136, the depth plane 310 is not perpendicular to the floor 110. As a result, there is a difference between the depth 308 from the camera 136 as compared to a horizontal distance 312 from the camera 136 to the line "t". This difference introduces a change in disparity in the apparent location of the same feature in the stereopair of image data 142.

The depth 308 for a row of pixels in the image data 142 having a coordinate y and baseline ("BL") 230 may be calculated using equations 4-8:

$$t = depth * (\sin(A) + h) \quad \text{EQUATION 4}$$

$$s = t/(\cos(A)) \quad \text{EQUATION 5}$$

$$depth/FL = s/y \text{ where } FL = \text{focal length} \quad \text{EQUATION 6}$$

$$depth = FL * BL / Disparity \quad \text{EQUATION 7}$$

$$disparity = BL * ((y * \cos(A) - FL * \sin(A))/h) \text{ where } h \text{ is height of the camera 136 above the floor} \quad \text{EQUATION 8}$$

A skew value indicative of a disparity difference "delta_d" between rows may then be calculated as:

$$skew\_value = BL * (\cos(A))/h \quad \text{EQUATION 9}$$

For example, if A=20 degrees, BL=100 mm, and h=160 mm, the skew value is 0.58 pixels per row.

Figure 4:
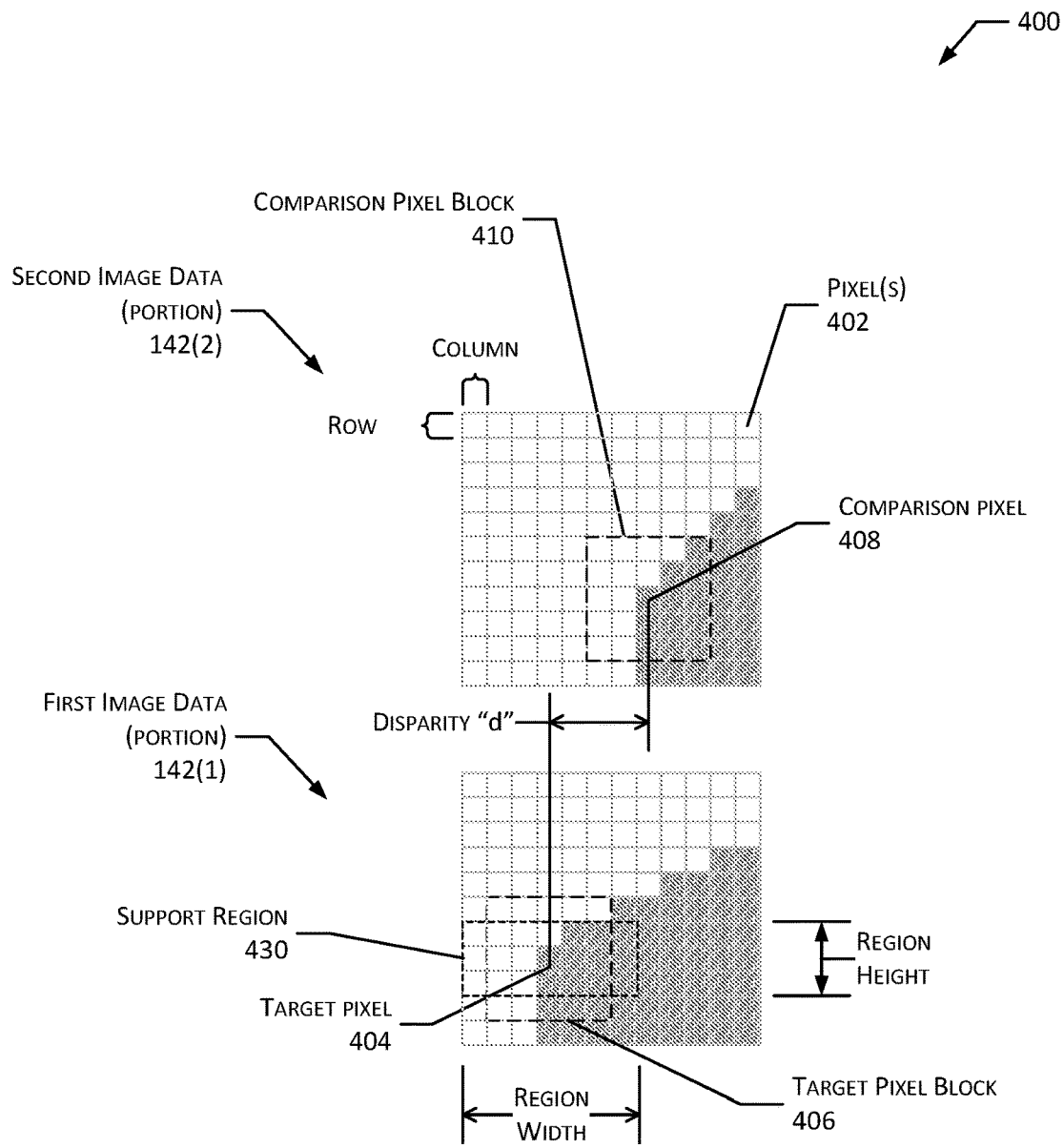
FIG. 4 illustrates a portion of the image data acquired by the stereocamera and attributes used to determine a score indicative of whether a pixel is representative of a floor or an obstacle, according to some implementations.
Figure 4:
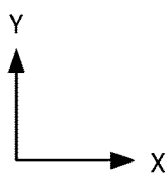

FIG. 4 illustrates a portion 400 of the image data 142 acquired by the stereocamera 134. A portion of the image data 142 acquired at a first time is shown that includes first image data 142(1) acquired by a first camera 136(1) and second image data 142(2) acquired by a second camera 136(2).

The image data 142 comprises pixels 402, each pixel having a coordinate or location with respect to an x-axis (rows) and a y-axis (columns). During operation of the stereodepth module 150, a target pixel 404 in the first image data 142(1) is processed. An individual pixel 402 may be insufficiently distinct to identify a feature and compare with the second image data 142. As a result, data associated with pixels in a target pixel block 406 may be processed and the output associated with the target pixel 404. For example, the target pixel block 406 may be centered on the target pixel 404. The target pixel 404 is compared to a comparison pixel 408 in the second image data 142(2). As with the target pixel 404, a comparison pixel block 410 may be used and the output associated with the comparison pixel 408.

The comparison between the target pixel 404 and the comparison pixel 408 attempts to find a match that indicates the comparison pixel 408 depicts the same feature as that associated with the target pixel 404. This matching cost computation may use a variety of different techniques to determine a per-pixel cost indicative of a match. In one implementation, a census transform algorithm may be used to represent the pattern of the pixels 402 in the block. A disparity cost may be calculated for a given pixel using a Hamming distance between the census transform output for the target pixel block 406 as compared to the census transform output for a plurality of comparison pixel blocks 410. A best match may be determined by the disparity cost that is lowest out of the set of possible disparities and their corresponding comparison pixels 408.

A disparity "d" is shown for the target pixel block 406. In this example, the disparity "d" for the feature indicated by the target pixel 404 is four pixels.

The stereodepth module 150 may use the perpendicular hypothesis module 152 to determine a first disparity cost that is associated with a best match using the perpendicular assumption and the parallel hypothesis module 154 to determine a second disparity cost that is associated with a best match using the parallel assumption and accounting for a skew value.

Based on the first disparity cost and the second disparity cost, a score may be calculated. In some implementations, accuracy of the score is improved by aggregating the score over a larger set of data. The score may be calculated using an aggregation of a first set of first disparity costs that are associated with pixels within a support region 430. For example, an aggregated disparity cost may be determined based on the disparity costs within the support region 430. In one implementation, the disparity costs within the support region 430 may be summed to determine the aggregated disparity cost. In another implementation the disparity costs within the support region 430 may be averaged to determine the aggregated disparity cost. In other implementations other functions may be used to determine the aggregated disparity cost.

Figure 5:
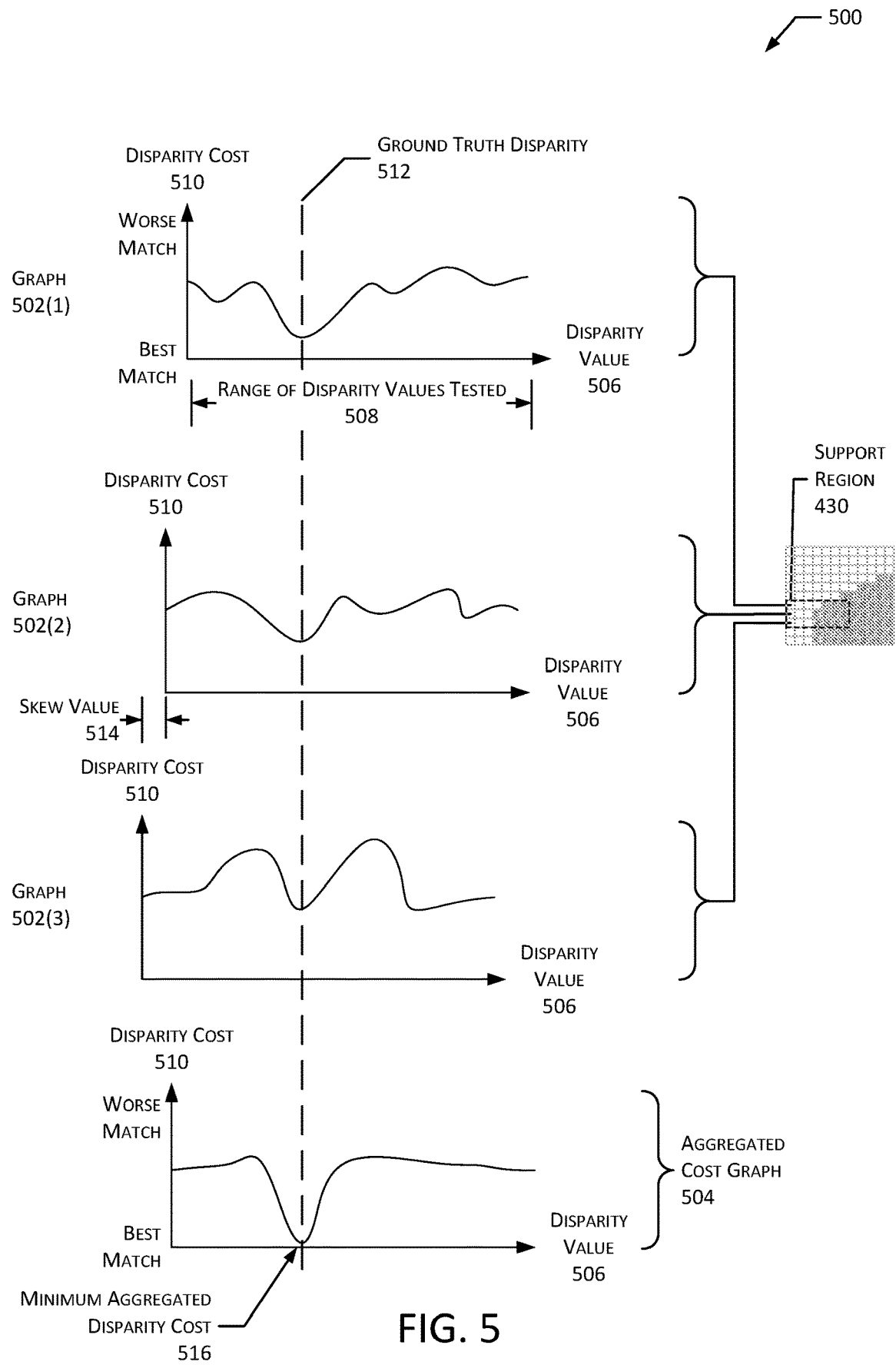
FIG. 5 illustrates disparity costs for different rows and a skew value of those rows, according to some implementations.

FIG. 5 illustrates at 500 several graphs of disparity costs for different rows of pixels and a skew value of those rows, according to some implementations. In this illustration, three graphs 502(1)-(3) are shown. Each graph 502 represents along the horizontal axis disparity values 506 of a range of disparity values tested 508, and the corresponding disparity cost 510 along a vertical axis. In this illustration, a best match is characterized by a lowest disparity cost 510.

A ground truth disparity 512 indicative of the actual disparity is indicated by a dashed line through the graphs 502(1)-(3). Each graph 502 is associated with a different row in the image data 142. Due to perspective effect, features depicted by rows in the image data 142 that are near the horizon 240 are farther away from the stereocamera 134 than the features depicted in rows that are far below the horizon 240, such as near the bottom of the image data 142. As a result, a first feature in the row near the horizon 240 exhibits less disparity than a second feature in the row near the bottom. This perspective effect results in a skew of shift in the apparent disparity. As described above, the skew value 514 may be calculated and used to shift the graphs 502 based on their row or coordinate values along the y axis.

In one implementation, the disparity costs 510 associated with pixels in the support region 430 as shifted by the skew value 514 may be summed across several rows to produce aggregated disparity costs. The aggregated disparity costs are depicted in the aggregated cost graph 504. By applying the skew value 514 and aggregating the costs, the effects of noise in the data is mitigated, and the best match in the aggregated cost graph 504 more accurately represents the ground truth disparity 512. For example, the best match of the aggregated disparity values may be the disparity value associated with a global minimum of the disparity costs 510. A minimum aggregated disparity cost 516 is indicated with respect to the aggregated cost graph 504. During processing, the parallel hypothesis module 154 may apply the skew value 514 and determine the aggregated costs as described above.

Figure 6:
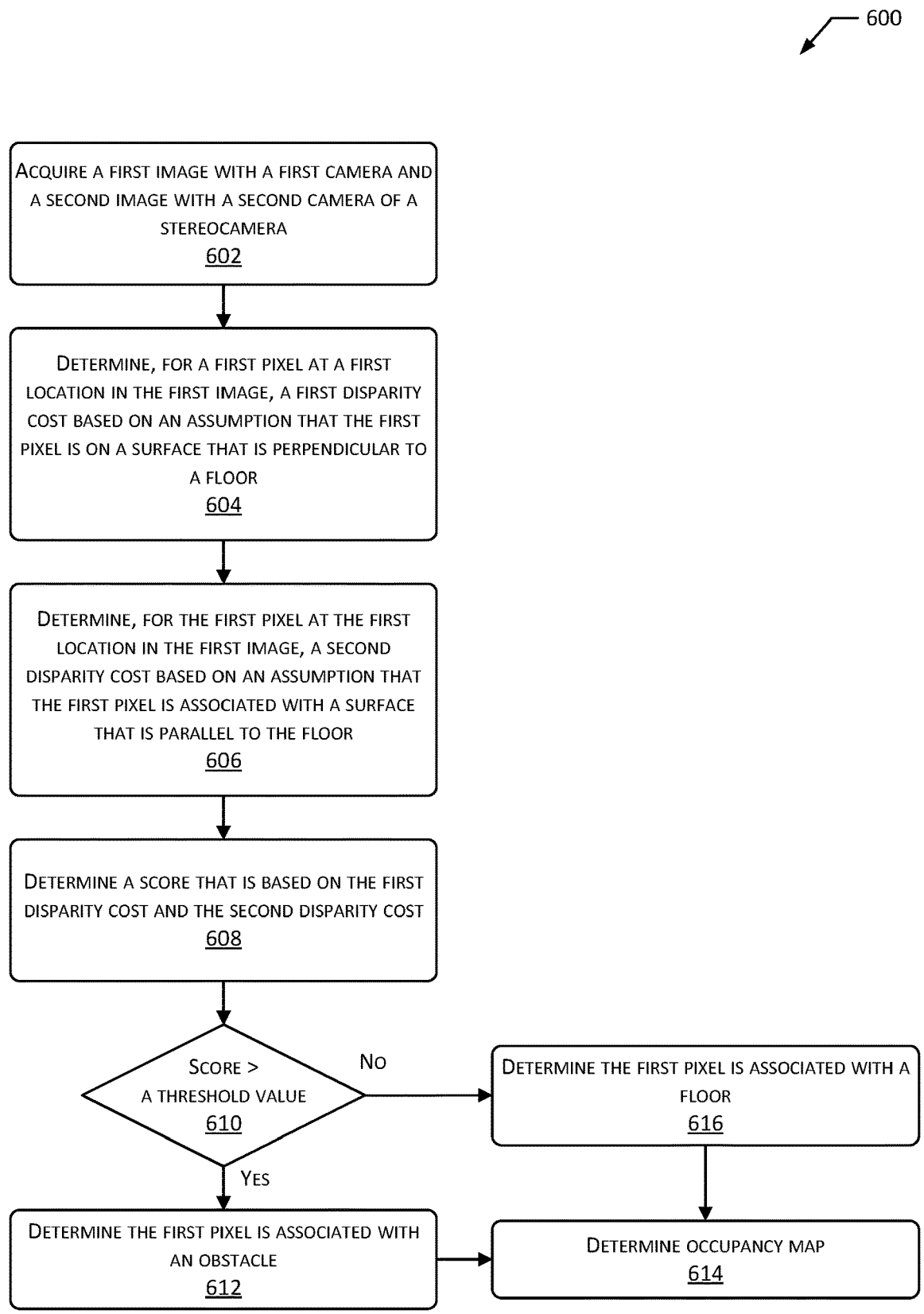
FIG. 6 is a flow diagram of a process for determining a score of whether a pixel is representative of a floor or an obstacle, according to some implementations.

FIG. 6 is a flow diagram 600 of a process for determining a score as to whether a pixel 402 is representative of a floor 110 or an obstacle 108, according to some implementations. The process may be implemented at least in part by the processor(s) 124 of the AMD 104, or by another device. For example, the AMD 104 may use the network interface 126 to send the image data 142 to another computing device such as a server.

At 602, a first image comprising first image data 142(1) is acquired with a first camera 136(1) and a second image comprising second image data 142(2) is acquired with a second camera 136(2). The cameras 136(1) and 136(2) form, or are part of, the stereocamera 134. Each image comprises a plurality of pixels 402.

The perpendicular hypothesis is used to determine a first disparity cost 510. At 604, for a first pixel 402 at a first location in the first image, the first disparity cost 510 is determined that is associated with a disparity value 506 that is associated with a best match between a first block of pixels in the first image that are associated with the first pixel 402 and a second block of pixels in the second image. For example, the perpendicular hypothesis module 152 may assume, while determining the aggregated disparity cost for a given pixel 402 on a surface, that the disparity values 506 of each pixel 402 in the support region 430 are on a surface that is perpendicular to the floor 110. With such an assumption, the disparity values 506 would be identical to one another.

In one implementation, the disparity costs 510 may be represented as an integral image. The set of first aggregated disparity costs indicative of aggregated disparity costs may be calculated using equation 10:

$$\text{Aggregated Disparity Costs Support Region Perpendicular}(x, y, d) = \sum_{j=-h/2}^{j<h/2} \sum_{i=-w/2}^{i=w/2} \text{cost}(x+i, y+j, d)$$

where:

x is a column of the first pixel in the second image y is a row of the first pixel in the second image i is an index with respect to x j is an index with respect to y h is the height of the support region w is the width of the support region cost is the function used to determine the disparity cost, such as a Hamming distance d is the disparity value Equation 10

The parallel hypothesis is used to determine a second disparity cost 510. At 606, for the first pixel 402 at the first location in the first image, a second disparity cost 510 is determined that is associated with a disparity value 506 that is associated with a best match between the first block of pixels and the second block of pixels. For example, the parallel hypothesis module 154 may assume, while determining the aggregated disparity cost for a given pixel 402 on a surface, that the disparity values 506 of each pixel 402 in the support region 430 are on a surface that is parallel to the floor 110. With such an assumption, each row of pixels 402 in the support region 430 is offset relative to an adjacent row by the skew value 514. With such an assumption, the disparity values 506 of each row of pixels 402 in the comparison pixel block 410 differ from one another by the skew value 514.

In one implementation, the disparity costs 510 may be represented as an integral image. The set of second aggregated disparity costs may be calculated using equation 11:

$$\text{Aggregated Disparity Costs Support Region Parallel}(x, y, d) = \sum_{j=-h/2}^{j<h/2} \sum_{i=-w/2}^{i=w/2} \text{cost}(x+i, y+j, \text{adjusted\_disparity}(x, y, d, i, j))$$

and $$\text{adjusted\_disparity}(x,y,d,i,j) = d + j * \text{skew\_value}$$

where:

x is a column of the first pixel in the second image y is a row of the first pixel in the second image i is an index with respect to x (e.g. column in image data)

j is an index with respect to y (e.g. row in image data)

h is the height of the support region w is the width of the support region cost is the function used to determine the disparity cost, such as a Hamming distance d is the disparity value and skew_value is the skew value as calculated in EQUATION 9

Equation 11

At 608, a score associated with the first pixel 402 is determined that is based on the first disparity cost 510 indicative of the best match and the second disparity cost 510 indicative of the best match. For example, the score may comprise a ratio of the first disparity cost 510 and the second disparity cost 510. In some implementations the scores may be aggregated. For example, the score may be based on a sum of the disparity costs 510 associated with the pixels within the support region 430.

At 610 a determination is made as to whether the score is greater than a threshold value or not. If yes, the process proceeds to 612. At 612, the pixel 402 is determined to be associated with an obstacle 108. If the determination at 610 is no, the process proceeds to 616. At 616 the pixel 402 is determined to be associated with the floor 110.

The steps of 604 and 606 may be iterated to process at least a portion of the image data 142. For example, the first disparity cost 510 and second disparity cost 510 may be determined for each of the pixels 402 in rows below a row that is associated with the horizon 240 as depicted in the image data 142.

At 614, an occupancy map 172 is determined based at least in part on the determination that a particular pixel 402 is associated with an obstacle 108 or the floor 110. For example, based on the location (coordinates) of the pixel 402 in the first image data 142(1), the depth 308, and the score, the occupancy map 172 may be populated with information about where in the physical space 102 obstacles 108 are located. The autonomous navigation module 180 may then use the occupancy map 172 to determine a path to move the AMD 104 in the physical space 102 such that collisions with obstacles 108 are avoided.

In some implementations, other hypotheses may be tested instead of, or in addition to, the perpendicular and parallel hypotheses described above. For example, hypotheses to test if a pixel 402 is associated with a down ramp or an up ramp may be performed. If the system determines that a ramp is present, the motion of the AMD 104 may be adjusted accordingly. For example, the AMD 104 may slow down when approaching a ramp. Once on the ramp, the AMD 104 may use another sensor 132, such as an inertial measurement unit (IMU) to determine whether it is moving on the ramp or has resumed travel on a flat floor 110.

The techniques described in this disclosure may also be adapted to detect the presence of walls 112. Instead of a skew value 514 being based on height above the floor 110, the skew value 514 may be indicative of a horizontal distance to the wall 112. In such an implementation, the skew value 514 would be applied to shift columns instead of rows as described above. Different skew values 514 could be tested.

The techniques described herein may be used by other devices and in other situations. For example, an augmented reality device, virtual reality device, mobile phone, tablet, and so forth may determine the presence and location of the obstacle 108 using the techniques described in this disclosure.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
acquiring a first image with a first camera and a second image with a second camera, wherein each of the first and second images comprise a plurality of pixels;
determining, for a first pixel in the first image, a first disparity cost that is based on an assumption that the first pixel is associated with a first surface that is at least approximately perpendicular to a floor;
determining, for the first pixel in the first image, a second disparity cost that is based on an assumption that the first pixel is associated with a second surface that is at least approximately parallel to the floor;
determining, based on the first disparity cost and the second disparity cost, a score indicative of whether the first pixel is associated with one of:
the first surface, or
the second surface;
generating occupancy map data based on the score, wherein the occupancy map data is indicative of a presence or absence of an obstacle at a location in a physical space; and
moving a device based at least in part on the occupancy map data.

2. The method of claim 1, the determining the second disparity cost for the first pixel comprising:
determining a first set of disparity values, wherein:
each disparity value of the first set of disparity values is relative to the first pixel and indicative of a second pixel in the second image,
the first set of disparity values comprises:
a first row of disparity values corresponding to a first row of pixels in the second image; and
a second row of disparity values corresponding to a second row of pixels in the second image;
determining, for each disparity value of the first set of disparity values, a disparity cost;
determining a skew value indicative of an offset of the first row with respect to the second row;
determining, for each disparity value of the first set of disparity values, an aggregated disparity cost that is based on the disparity costs within a support region specified with respect to the each disparity value, wherein the disparity costs in the support region that are associated with the first row are offset by the skew value with respect to the disparity costs in the support region that are associated with the second row; and
wherein the second disparity cost is a minimum of the aggregated disparity costs for the first pixel.

3. The method of claim 1, the determining the first disparity cost for the first pixel comprising:
determining a first set of disparity values, wherein:
each disparity value of the first set of disparity values is relative to the first pixel and indicative of a second pixel in the second image, the first set of disparity values comprises a first row of disparity values corresponding to a first row of pixels in the second image;

the first set of disparity values comprises a second row of disparity values corresponding to a second row of pixels in the second image;

determining, for each disparity value of the first set of disparity values, a disparity cost;

determining, for each disparity value of the first set of disparity values, an aggregated disparity cost that is based on the disparity costs within a support region specified with respect to the each disparity value, wherein the disparity costs in the support region that are associated with the first row are aligned with respect to the disparity costs in the support region that are associated with the second row; and wherein the first disparity cost is a minimum of the aggregated disparity costs for the first pixel.

4. The method of claim 1, further comprising:

determining, that the first pixel is associated with a floor if the score is less than a threshold value or the obstacle if the score is greater than the threshold value.

5. The method of claim 1 further comprising:

determining, based on a disparity value that is associated with the second disparity cost, a distance in the physical space between the first camera and an object depicted in the first image.

6. The method of claim 1, further comprising:

determining, based on a disparity value that is associated with the second disparity cost, a distance in the physical space between the first camera and an object depicted in the first image; and wherein generating the occupancy map data is further based on the distance and the score, wherein the occupancy map data is indicative of a presence or absence of the obstacle at the location in the physical space corresponding to the distance.

7. The method of claim 2, the determining the aggregated disparity cost comprising:

a sum of the disparity costs within the support region, or an average of the disparity costs within the support region.

8. The method of claim 2, further comprising:

determining a first height of the first camera above the floor and a second height of the second camera above the floor;

determining a first distance horizontally between the first camera and the second camera;

determining an angle between horizontal and an optical axis of the first camera; and determining the skew value based on the first height, the second height, the first distance, and the angle.

9. The method of claim 1, further comprising:

determining a height of the first camera above the floor;

determining an angle between horizontal and an optical axis of the first camera; and determining, based on the height and the angle, a row of pixels that is associated with a horizon as depicted in the first image; and wherein determining one or more of the first disparity cost, the second disparity cost, or the score is limited to pixels below the row of pixels in the first image.

10. A device comprising:

a first camera;

a second camera;

one or more memories storing first computer-executable instructions; and one or more processors to execute the first computer-executable instructions to:

acquire a first image with the first camera and a second image with the second camera, wherein each image of the first and second images comprises a plurality of pixels;

determine, for a first pixel in the first image, a first disparity cost that is based on an assumption that the first pixel is associated with a first surface that is at least approximately perpendicular to a floor associated with a physical space;

determine, for the first pixel in the first image, a second disparity cost that is based on an assumption that the first pixel is associated with a second surface that is at least approximately parallel to the floor;

determine, based on the first disparity cost and the second disparity cost, a score;

determine, based on a disparity value that is associated with the second disparity cost, a distance in the physical space between the first camera and an obstacle depicted in the first image;

generate occupancy map data based on the distance and the score, wherein the occupancy map data is indicative of a presence or absence of the obstacle at a location in the physical space corresponding to the distance; and move the device based at least in part on the occupancy map data.

11. The device of claim 10, the instructions to determine the second disparity cost for the first pixel further comprising instructions to:

determine a first set of disparity values, wherein:

each disparity value of the first set of disparity values is relative to the first pixel and indicative of a second pixel in the second image, the first set of disparity values comprises:

a first row of disparity values corresponding to a first row of pixels in the second image; and a second row of disparity values corresponding to a second row of pixels in the second image;

determine, for each disparity value of the first set of disparity values, a disparity cost;

determine a skew value indicative of an offset of the first row with respect to the second row;

determine, for each disparity value of the first set of disparity values, an aggregated disparity cost that is based on the disparity costs within a support region specified with respect to the each disparity value, wherein the disparity costs in the support region that are associated with the first row are offset by the skew value with respect to the disparity costs in the support region that are associated with the second row; and wherein the second disparity cost is a minimum of the aggregated disparity costs for the first pixel.

12. The device of claim 11, wherein a first optical axis of the first camera and a second optical axis of the second camera are directed upward relative to the floor; and further comprising instructions to:

determine a height above the floor of the first camera and the second camera;

determine a first distance horizontally between the first camera and the second camera;

determine an angle between horizontal and the first optical axis; and determine the skew value based on the height, the first distance, and the angle.

13. The device of claim 10, the instructions to determine the first disparity cost for the first pixel further comprising instructions to:
   determine a first set of disparity values, wherein:
      each disparity value of the first set of disparity values is relative to the first pixel and indicative of a second pixel in the second image,
      the first set of disparity values comprises a first row of disparity values corresponding to a first row of pixels in the second image; and
      the first set of disparity values comprises a second row of disparity values corresponding to a second row of pixels in the second image;
   determine, for each disparity value of the first set of disparity values, a disparity cost;
   determine, for each disparity value of the first set of disparity values, an aggregated disparity cost that is based on the disparity costs within a support region specified with respect to the each disparity value, wherein the disparity costs in the support region that are associated with the first row are aligned with respect to the disparity costs in the support region that are associated with the second row; and
   wherein the first disparity cost is a minimum of the aggregated disparity costs for the first pixel.

14. The device of claim 10, further comprising instructions to:
   determine, based on the score, that the first pixel is associated with the second surface if the score is less than a threshold value or associated with the first surface if the score is greater than the threshold value.

15. The device of claim 10, further comprising instructions to:
   determine, based on the disparity value that is associated with the second disparity cost, the distance in the physical space between the first camera and an object depicted in the first image.

16. The device of claim 10, further comprising instructions to:
   determine a height of the first camera and the second camera above the floor;
   determine an angle between horizontal and an optical axis of the first camera; and
   determine, based on the height and the angle, a row that is associated with a horizon as depicted in the first image; and
   wherein determination of one or more of the first disparity cost, the second disparity cost, or the score is limited to pixels below the row in the first image.

17. A method comprising:
   acquiring a first image with a first camera and a second image with a second camera, wherein each image of the first and second images comprises a plurality of pixels;
   determining, for a first pixel in the first image, a first disparity cost that is based on an assumption that the first pixel is associated with a first surface that is at least approximately perpendicular to a second surface;
   determining, for the first pixel in the first image, a second disparity cost that is based on an assumption that the first pixel is associated with a third surface that is at least approximately parallel to the second surface;
   determining, based on the first disparity cost and the second disparity cost, a score indicative of whether the first pixel is associated with one of:
      the first surface, or
      the third surface;
   generating occupancy map data based on the score, wherein the occupancy map data is indicative of a presence or absence of an obstacle at a location in a physical space; and
   moving a device based at least in part on the occupancy map data.

18. The method of claim 17, the determining the first disparity cost for the first pixel comprising:
   determining a first set of disparity values, wherein:
      each disparity value of the first set of disparity values is relative to the first pixel and indicative of a second pixel in the second image,
      the first set of disparity values comprises a first row of disparity values corresponding to a first row of pixels in the second image; and
      the first set of disparity values comprises a second row of disparity values corresponding to a second row of pixels in the second image;
   determining, for each disparity value of the first set of disparity values, a disparity cost;
   determining, for each disparity value of the first set of disparity values, a first aggregated disparity cost that is based on the disparity costs within a support region specified with respect to the each disparity value, wherein the disparity costs in the support region that are associated with the first row are aligned with respect to the disparity costs in the support region that are associated with the second row; and
   wherein the first disparity cost is a minimum of the first aggregated disparity costs for the first pixel; and
   the determining the second disparity cost for the first pixel comprising:
   determining a skew value indicative of an offset of the first row with respect to the second row;
   determining, for each disparity value of the first set of disparity values, a second aggregated disparity cost that is based on the disparity costs within the support region specified with respect to the each disparity value, wherein the disparity costs in the support region that are associated with the first row are offset by the skew value with respect to the disparity costs in the support region that are associated with the second row; and
   wherein the second disparity cost is a minimum of the second aggregated disparity costs for the first pixel.

19. The method of claim 17, further comprising:
   determining, based on the disparity value that is associated with the second disparity cost, a distance in the physical space between the first camera and an object depicted in the first image.

20. The method of claim 17, further comprising:
   determining a height of the first camera and the second camera above the first surface;
   determining an angle between horizontal and an optical axis of the first camera;
   determining, based on the height and the angle, a row of pixels that is associated with a horizon as depicted in the first image; and
   wherein determination of one or more of the first disparity cost, the second disparity cost, or the score is limited to pixels below the row in the first image.

* * * * *